United States Patent [19]
Atanasio

[11] Patent Number: 5,103,799
[45] Date of Patent: Apr. 14, 1992

[54] COLLAPSIBLE BARBEQUE GRILL

[75] Inventor: Jacinto Atanasio, Jardines de Caguas, P.R.

[73] Assignee: Star Wire Products, Inc., Caguas, P.R.

[21] Appl. No.: 608,478

[22] Filed: Nov. 2, 1990

[51] Int. Cl.⁵ .............................................. F24C 1/16
[52] U.S. Cl. ................... 126/9 R; 126/25 A; 99/450; 211/181
[58] Field of Search ............ 126/9 R, 9 A, 9 B, 25 R, 126/25 A, 25 AA, 339, 29, 30; 99/421, 449, 450, 448; 211/181, 178

[56] References Cited
U.S. PATENT DOCUMENTS

| | | | |
|---|---|---|---|
| 3,407,802 | 10/1968 | Warner | 126/25 R |
| 3,905,286 | 9/1975 | LeGrady | 126/25 R |
| 4,117,825 | 10/1978 | Robertson | 126/9 R |
| 4,433,671 | 2/1984 | DeAmicis | 126/9 R |
| 4,488,535 | 12/1984 | Johnson | 126/25 A |
| 4,548,193 | 10/1985 | Marogil | 126/25 A |

Primary Examiner—James C. Yeung
Attorney, Agent, or Firm—Oblon, Spivak, McClelland, Maier & Neustadt

[57] ABSTRACT

A collapsible charcoal grill has two frames pivoted together at one end. One frame is retained in a vertical position by struts and the other frame has folding support means. A broiling grill has hooks at one end for engagement over one of a number of spaced horizontal rods on the second frame and legs at that same end engage a lower horizontal rod to support the broiling grill in cantilever fashion over the other frame which is designed to support a receptacle for burning charcoal.

9 Claims, 4 Drawing Sheets

COLLAPSIBLE BARBEQUE GRILL

FIELD OF THE INVENTION

This invention relates to barbeque grills and more particularly to a collapsible barbeque grill.

BACKGROUND OF THE INVENTION

The present invention bears a certain similarity to charcoal grills known as "hibachis" wherein a heavy cast iron receptacle is provided for receiving charcoal, and at one side of the receptacle are heavy upstanding members having vertically spaced notches for receiving the end of a grill and support it in cantilever fashion at a selected distance above the charcoal. The problem with such grills is that they are heavy and unwieldy, and because nothing on them is collapsible, they are difficult to store, and the removal of the residue of the charcoal always presents a problem.

An object of the present invention is to provide a barbeque grill which is lightweight, collapsible and thus easily stored, and provides all the advantages of a conventional hibachi including the ability to position a cooking grill at a selected height above a charcoal bed.

BRIEF DESCRIPTION OF THE INVENTION

The grill of the invention consists of first and second frames preferably of welded rigid wire construction pivoted together at adjacent ends. The first frame has folding supports which may be opened to support the grill above a suitable support surface. The supports fold under the first frame and the second frame folds down over the first frame for storage. When the supports are extended and the second frame raised and is releasably retained in place, a plurality of vertically spaced horizontal bars on the second frame are designed to receive hooks on the end of a third grilling frame which also has downwardly extending legs to engage a lower bar on the second frame to support the third frame in cantilever fashion at a selected height above the first frame which is adapted to support a receptacle for charcoal.

DETAILED DESCRIPTION OF THE INVENTION

Figure 1:
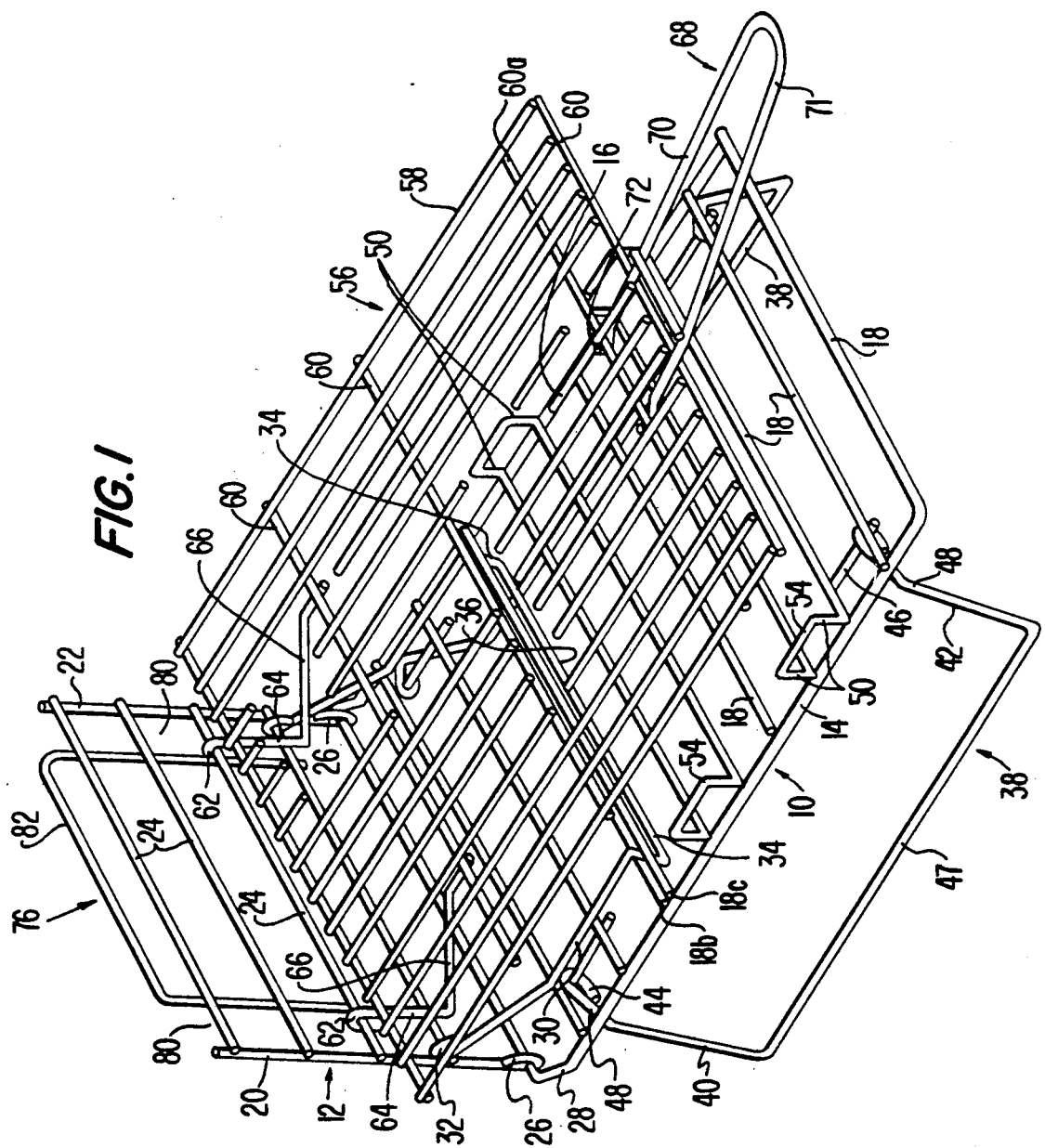
FIG. 1 is a perspective view of the grill of the invention set-up in readiness for use.

Referring now to the drawings the numerals 10 and 12 designate a pair of frames. The frame 10 comprises a pair of rigid, parallel, laterally spaced side members 14, 16 and a plurality of longitudinally spaced rigid cross members 18 joined at their opposite ends, as by welding, to the respective side members 14, 16. In like fashion, the frame 12 also comprises a pair of rigid, parallel, laterally spaced side members 20, 22, and a plurality of longitudinally spaced rigid cross members 24 integrally joined at their opposite ends to the respective side members 20, 22.

The frames 10, 12 are hinged together at their adjacent ends, conveniently, by the provision of loops 26 at the ends of the side members 20, 22 of the frame 12 which encircle the cross member 18a at one end of the frame 10. Desirably the cross member 18a is elevated slightly above the plane of the frame 10 by upturned bends 28 at the ends of the side members 14, 16 to facilitate movement of said frame 12 between a first collapsed position wherein the frames 10, 12 are substantially parallel to each other and a second raised position, as shown in FIG. 1, wherein the second frame 10 is substantially normal to the first frame.

Strut means such as the arms 30 are pivotally connected to one of the frames 10, 12 as by loops 32 at one end of each arm encircling a cross member 24 of the second frame 12, and are releasably connectable to the other of the frames 10, 12. In accordance with the invention, the releasable connection comprises downturned parts 34 at the ends of the arms 30 opposite the loops 32. A pair of cross members 18b, 18c on the frame 10 are closely spaced apart a distance to receive frictionally therebetween the downturned end part 34 of the arms 30. Desirably the downturned end parts 34 are integrally connected together by a cross bar 36 of a size to pass between the closely spaced cross bars 18b, 18c of the frame 10 as clearly seen in FIG. 1.

Figure 4:
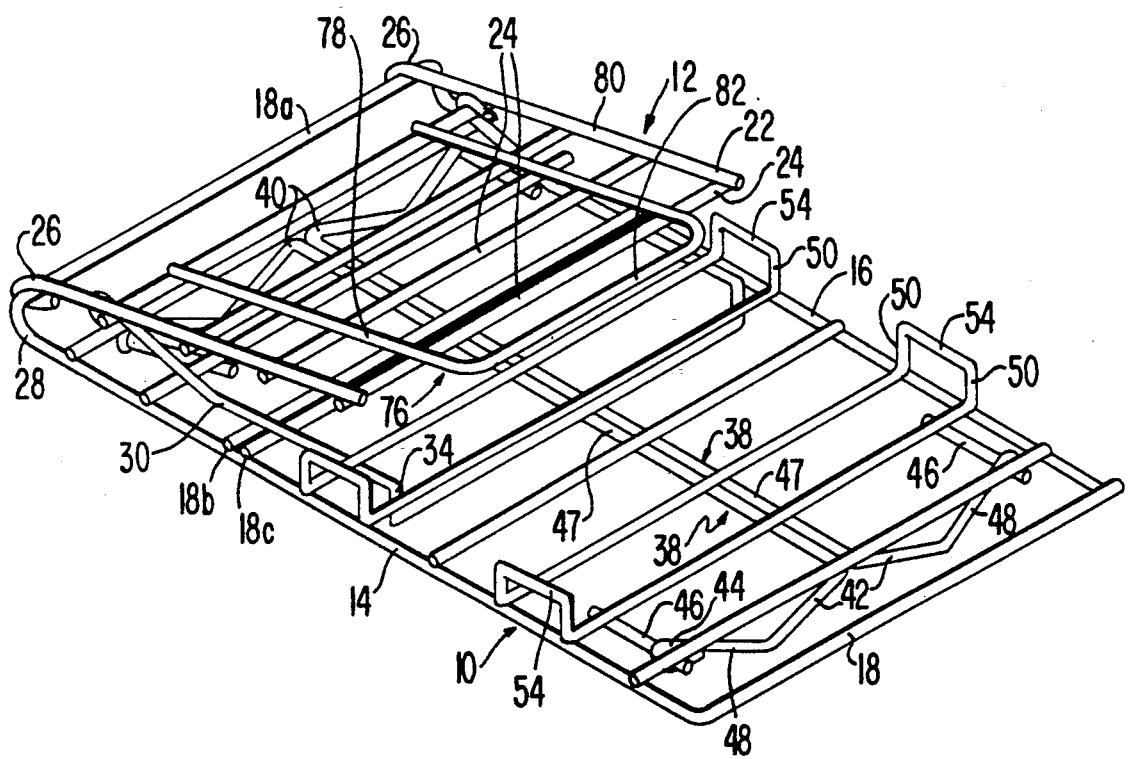
FIG. 4 is a perspective view showing collapsible parts of the invention in their collapsed position.

The assembly so far described is provided with support means 38 pivoted to the frame 10 for movement between a first collapsed position substantially parallel to the underside of the first frame 10, as shown in FIG. 4 to a second extended position, as shown in FIG. 1, for engagement with a support surface with means being provided for releasably retaining the support means in their extended position.

Figure 3:
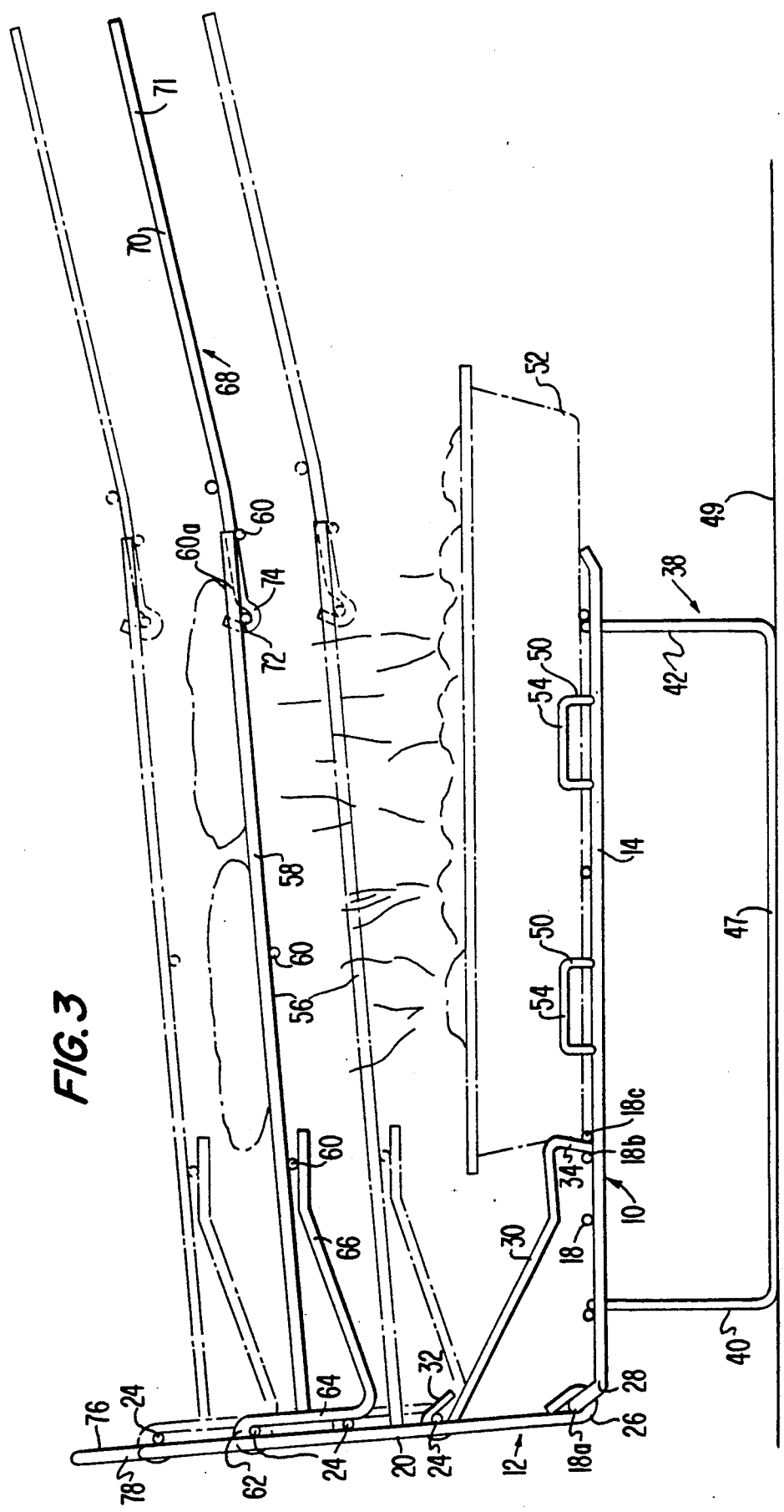
FIG. 3 is a side elevational view of the invention.

In accordance with the invention, each of the support means 38 comprises a pair of arms 40, 42, one pair on each of the respective sides of the first frame 10. The inner ends of each are pivotally connected to the frame as by loops 44 encircling short rods 46 welded to the underside of a pair of cross members 18 parallel to but spaced inwardly from the side members 14, 16 of the frame 10. A bar 47 rigidly interconnects the outer ends of each pair of arms 40, 42 and is adapted to engage a support surface 49 as shown in FIG. 3. The means for retaining the support means in their extended positions of FIG. 1 comprise stop means carried by at least one arm of each pair for engaging a side member 14 of the first frame to limit the movement of the interconnected arms in an extended direction. Conveniently the stop means comprise bent parts 48 adjacent the upper ends of the arms 40, 42 which engage the respective side members 14, 16 of the frame 10 to limit the opening movement of the interconnected arms 40, 42. The angle of the bent parts 48 and the rest of the arms 40, 42 is selected such that when the arms are in their supporting position, they extend downwardly and outwardly at a sufficiently wide angle with respect to the plane of the frame 10 that it and the components attached thereto or carried thereon during use, are stably supported with little danger of the supports suddenly collapsing inwardly beneath the frame 10. Alternatively, the described support means could be pivoted to cross members 18 spaced inwardly from the end cross members, the bent parts 48 engaging the end cross members 18 exactly as they engage the side cross members 14 as shown in FIG. 1.

Figure 2:
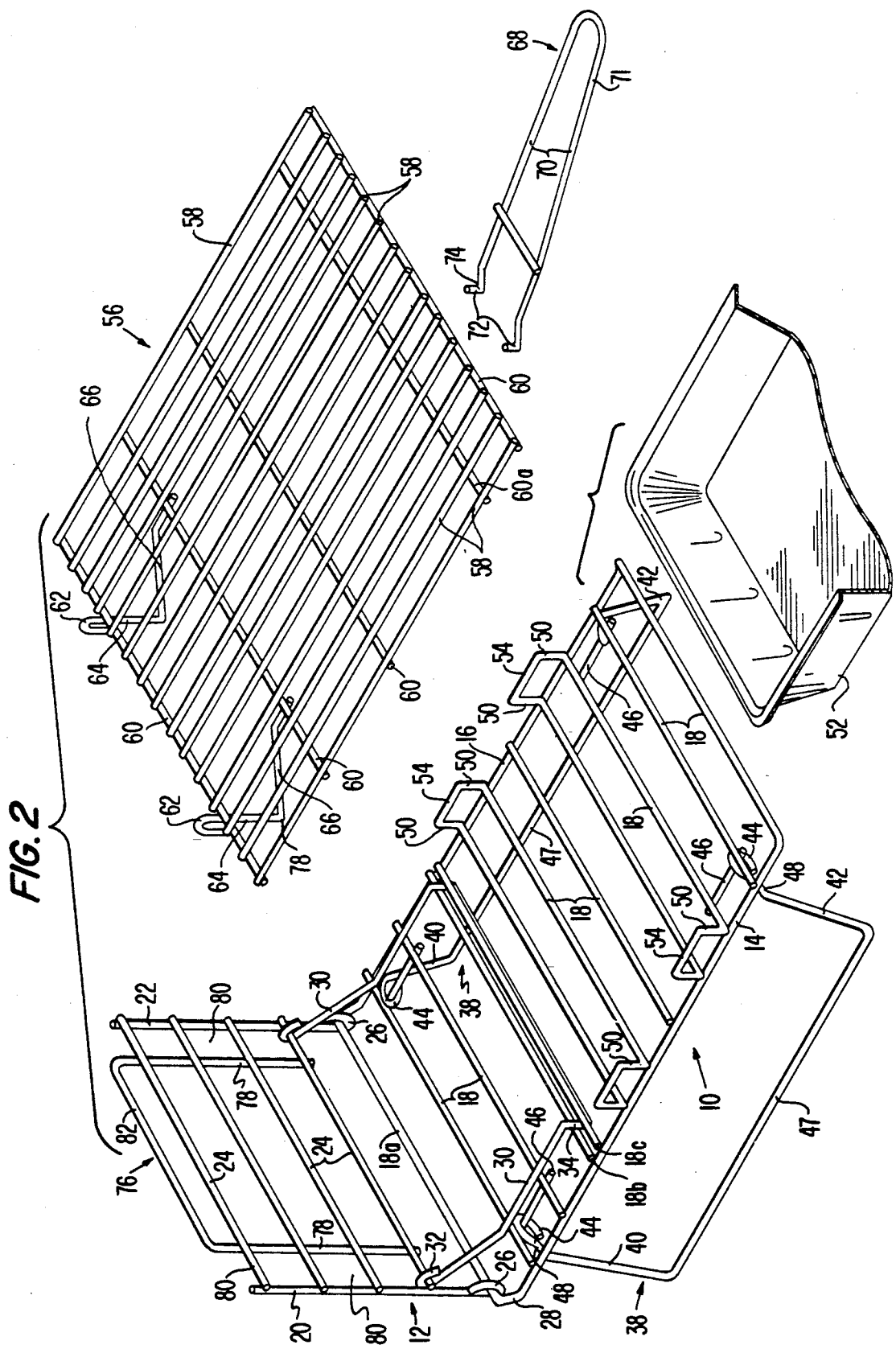
FIG. 2 is an exploded perspective view of the components of the invention.

With reference to FIGS. 1 and 2, it will be observed that the ends on opposite sides of the frame 10 of at least some of the cross members 18 have upstanding parts 50 which serve as retaining guides for a charcoal receptacle 52 placed on the first frame 10 after the first and second frames and the supports have been moved to their second open position. Desirably the upper ends of adjacent upstanding parts 50 are integrally joined together by bars 54.

As best seen in FIG. 2, the grill includes a third frame 56 composed of laterally and longtidunally spaced rigid members 58, 60 integrally connected together at their crossing points to define an open-mesh food product support grid having opposed sides and ends defined by the outer most grid members 58, 60, respectively. Downwardly open hooks 62 are fixed to one end of the frame 56 as by welding to the end member 60 and are adapted to engage a selected one of the cross members 24 of the second frame 12 when the latter is in its second open position of FIG. 1. Downwardly extending leg means 64 are also rigidly fixed to the third frame at the same end as the hooks 62 and are of a length to engage a cross member 24 of the second frame member below the selected cross member engaged by the hooks in order to support the third frame 56 in cantilever fashion over and substantially parallel to the first frame 10. Conveniently, the leg means 64 are integral extensions of the hooks 62, the lower ends of the leg means being rigidly connected to the frame 56 by struts 66 which may be bent continuations of the combined hooks and leg means and whose inner ends are welded to an inner cross member 60 as clearly shown in FIG. 3.

In use, the frames 10, 12 and supports are moved to their open position and the receptacle 52 with charcoal therein is placed on the frame 10 between the upstanding guides 50. After the charcoal is ignited and in condition for broiling, the food to be broiled, say a steak, is placed on the third frame which may then be picked-up by a lifting tool 68 shown best in FIG. 2. The tool 68 comprising a U-shaped member having diverging arms 70 defining a handle 71 and whose outer ends 72 are bent upwardly to define laterally spaced hooks 74 adapted to be inserted from the top of the frame 56 between adjacent laterally spaced members 58 defining the grid of the third frame for engagement under a cross member 60a specially located in a convenient position for engagement by the hooks 74. During lifting, the undersides of the tool arms 70 engage the upper side of the outer-most cross member whereby the third frame 56 is supported by the tool in cantilever fashion as should be clear from FIG. 3. After being thus lifted by the tool, it is a simple task to engage the hooks 62 at the opposite end of the frame 56 with a selected one of the cross members 24 on the second frame which vertically positions the third frame and a food product thereon a proper distance above the charcoal bed in the receptacle 52, as should be clear from FIG. 3.

As an aid in centering the third frame over the first frame and over the charcoal recepticle, the second frame may have welded thereto an inverted U-shaped member 76 whose side arms 78 are spaced inwardly from the side members 20 of the second frame 12. This arrangement provides positioning spaces 80 between the arms 78 and side members 20 into which the hook are first inserted before being engaged with the selected cross member. As can be seen the cross member 82 of the positioning member 76 extends above the uppermost cross member 24 as do the upper ends of the side members 20 to provide guide spaced 80 for the hooks when they are to be engaged with the upper-most cross member.

Upon completion of cooking, the third frame 56 is lifted by the tool 68 to disengage the hooks 62 from the second frame 12. The charcoal receptacle 52 is removed and the ends 34 of the strut arms 30 are lifted from between the closely spaced cross members 18b, 18c of the first frame 10 to permit the second frame 12 to be folded to a substantially parallel position over the first frame as shown in FIG. 4. The supports 38 are then folded inwardly towards each other beneath the frame 10, the arms 40, 42 of the supports 38 desirably having a length such that the connecting rods 47 of the supports, when the arms are folded to the position of FIG. 4, lie side-by-side rather than overlap. The folded assembly may then be conveniently placed on the third frame 56 for storage in a suitable receptacle. The charcoal receptacle 52 may be a conventional commercially available lightweight aluminum pan which may be discarded after use or it may be a prepackaged charcoal container intended to be discarded after a single use, though the use of a permanent heavy gauge metal receptacle is not excluded.

Having now described the invention it will be apparent that the invention is susceptible of a variety of changes and modifications, without, however, departing from the scope and spirit of the appended claims.

What is claimed is:

1. A barbeque grill comprising first and second frames, each comprising a pair of rigid parallel, laterally spaced side members and a plurality of longitudinally spaced, rigid cross members integrally joined at their opposite ends to the respective side members, said first and second frames being hinged together at adjacent ends for movement between a first collapsed position wherein said frames are substantially parallel to each other and a second raised position wherein said second frame is substantially normal to said first frame, strut means pivoted at one end to one of said frames and releasably connectable to the other of said frames to retain said frames in said second position, and support means pivoted to said first frame for movement between a first collapsed position substantially parallel to the underside of said first frame to a second extended position for engagement with a support surface, and means for releasably retaining said support means in its second extended position.

2. The grill of claim 1 including a third frame comprising laterally and longitudinally spaced rigid members integrally connected together to define an open-mesh food product support grid having opposed sides and ends, laterally spaced, downwardly open hooks fixed to one end of third frame for engagement over a selected one of the cross members of said second frame when in its second open position, and downwardly extending leg means rigidly fixed to said third frame at the same end as said hooks and of a length to engage a cross member of said second frame below the selected one engaged by said hooks to support said third frame in cantilever fashion over and substantially parallel to said first frame.

3. The grill of claim 2 wherein each of said leg means is an integral part of a respective hook.

4. The grill of claim 1 wherein the ends on opposite sides of said first frame of at least some of said cross members have upstanding parts to serve as retaining guides for a charcoal receptacle placed on said first frame after said first and second frames and said support means have been moved to their second positions.

5. The grill of claim 4 wherein the outer ends of adjacent upstanding parts are integrally connected together by rigid bars.

6. The grill of claim 1 wherein said strut means are defined by a pair of arms pivoted at one end to one of said cross members of said second frame and having downturned parts at their opposite ends, and a pair of cross members on said first frame are closely spaced apart a distance to receive frictionally therebetween the downturned end parts of said arms.

7. The grill of claim 6 wherein the downturned end parts of said arms are integrally connected together by a cross bar of a size to pass between said closely spaced cross bars of said first frame.

8. The grill of claim 1 wherein said support means comprises a pair on each side of said first frame of arms, the inner ends of the arms of each pair being pivotally connected at spaced positions to said first frame, a bar rigidly interconnecting the outer ends of each pair of arms and being adapted to engage said support surface when said support means are in their second extended position, said means for retaining said suppOrt means in their extended positions comprising stop means carried by at least one arm of each pair for engaging one of said side and cross members of said first frame to limit the movement of said interconnected arms in an extended direction.

9. The grill of claim 2 wherein the members defining the respective frames are rigid wire welded together at their points of intersection.

* * * * *